United States Patent [19]

von der Crone

[11] Patent Number: 4,970,310

[45] Date of Patent: Nov. 13, 1990

[54] ISOINDOLINE PIGMENT COMPOUNDS

[75] Inventor: Jost von der Crone, La Dey, Switzerland

[73] Assignee: Ciba-Geigy Corporation, Ardsley, N.Y.

[21] Appl. No.: 395,243

[22] Filed: Aug. 17, 1989

[30] Foreign Application Priority Data

Aug. 19, 1988 [CH] Switzerland ............ 3092/88

[51] Int. Cl.[5] .......................................... C07D 401/14
[52] U.S. Cl. ..................................... 544/284; 106/498
[58] Field of Search ......................................... 544/284

[56] References Cited

U.S. PATENT DOCUMENTS

| 4,262,120 | 4/1981 | von der Crone | 544/284 |
| 4,340,735 | 7/1982 | Latsch et al. | 544/284 |
| 4,426,533 | 1/1984 | Rochat et al. | 544/284 |
| 4,719,300 | 1/1988 | Lotsch | 544/284 |
| 4,758,663 | 7/1988 | Scherer et al. | 544/284 |
| 4,892,945 | 1/1990 | Jost et al. | 544/263 |

FOREIGN PATENT DOCUMENTS 0298037 1/1989 European Pat. Off. .

Primary Examiner—Glennon H. Hollrah
Assistant Examiner—James H. Turnipseed
Attorney, Agent, or Firm—Harry Falber

[57] ABSTRACT

Isoindoline compounds of the formula

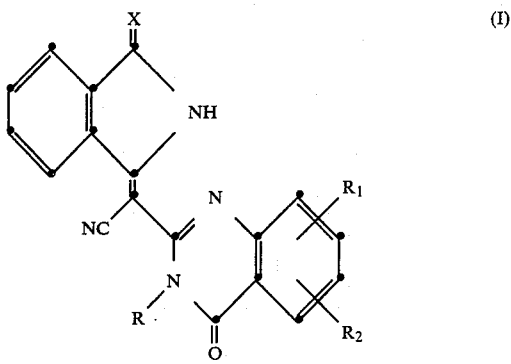

(I)

in which R is $C_1$–$C_4$alkyl, unsubstituted or $C_1$–$C_4$alkyl-, $C_1$–$C_4$alkoxy- or halogen-substituted phenyl, benzyl or phenylethyl, $R_1$ and $R_2$, independently of one another are hydrogen, halogen, $C_1$–$C_4$alkyl or $C_1$–$C_4$alkoxy and X is one of the groups of the formulae

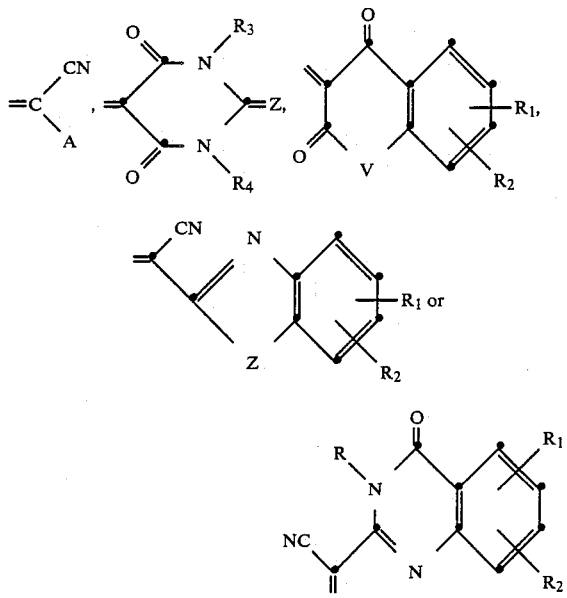

in which R, $R_1$ and $R_2$ are as defined above, A is one of the groups, —CN, —COO—($C_1$–$C_4$alkyl) or —CONH—$R_5$, $R_3$, $R_4$ and $R_5$, independently of one another, are hydrogen or have the same meaning as R, V is —NH— or —O— and Z is —O—, —S—, —NH— or —NH(CH)—.

These isoindolines containing at least one N-substituted quinazolone radical are distinguished by excellent pigment properties, in particular by very high weather fastness.

4 Claims, No Drawings

ISOINDOLINE PIGMENT COMPOUNDS

The present invention relates to novel isoindoline compounds having at least one N-substituted quinazolone radical and to their use as pigments.

Isoindoline pigments containing N-unsubstituted quinazolone radicals have been disclosed in U.S. Pat. No. 4,371,735, No. 4,340,735 and No. 4,525,591 and in German Offenlegungsschrift No. 3,311,375. Although these pigments have in general good suitability for pigmenting high-molecular-weight organic material, they do not always completely meet today's requirements for certain applications, for example in automotive paints.

Novel isoindoline pigments having at least one N-substituted quinazolone radical, which are distinguished by surprisingly good pigment properties, have now been found. These pigments are particularly suitable, for example, especially for the use in automotive paints.

The present invention accordingly relates to isoindoline compounds of the formula

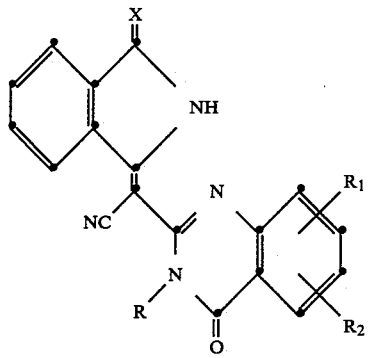
(I)

in which R is $C_1$–$C_4$alkyl, unsubstituted or $C_1$–$C_4$alkyl-, $C_1$–$C_4$alkoxy- or halogen-substituted phenyl, benzyl or phenylethyl, $R_1$ and $R_2$, independently of one another, are hydrogen, halogen, $C_1$–$C_4$alkyl or $C_1$–$C_4$alkoxy and X is one of the groups of the formulae

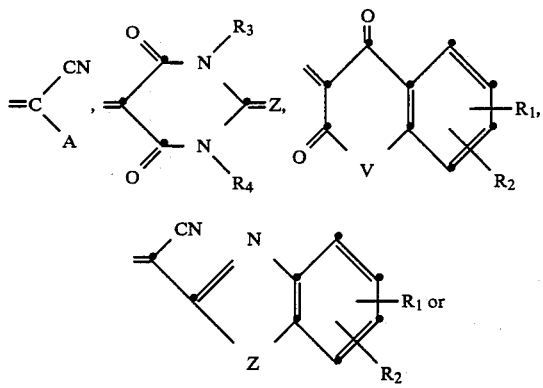

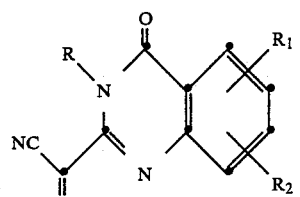

in which R, $R_1$ and $R_2$ are as defined above, A is one of the groups —CN, —COO—($C_1$–$C_4$alkyl) or —CONH—$R_5$, $R_3$, $R_4$ and $R_5$, independently of one another, are hydrogen or have the same meaning as R, V is —NH— or —O— and Z is —O—, —S—, —NH— or —N(CN)—.

Halogen is, for example, bromine, iodine, fluorine and preferably chlorine.

Any $C_1$–$C_4$alkyl substituents can be methyl, ethyl, n-propyl, isopropyl, n-butyl, sec-butyl or tert-butyl.

Any $C_1$–$C_4$alkoxy substituents can be methoxy, ethoxy, n-propyloxy, isopropyloxy, n-butyloxy, sec-butyloxy or tert-butyloxy.

Indoline compounds of the formula I in which R is $C_1$–$C_4$alkyl, unsubstituted or chlorine-, methyl-, methoxy- or ethoxy-substituted phenyl, $R_1$ and $R_2$ are hydrogen and X is one of the groups of the formulae

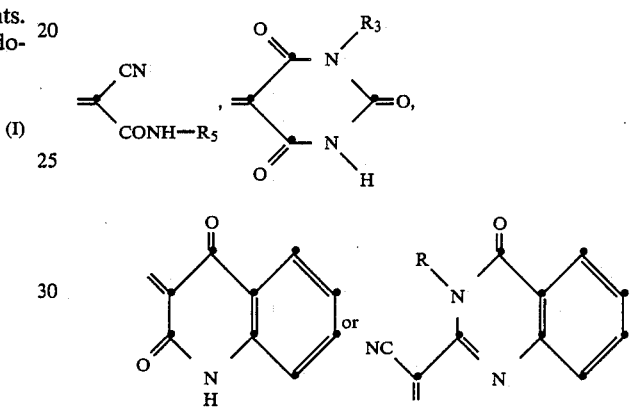

in which R has the meaning already mentioned as preferred, $R_3$ is hydrogen or has the same preferred meaning as R, and $R_5$ is unsubstituted or $C_1$–$C_4$alkyl-, $C_1$–$C_4$alkoxy- or halogen-substituted phenyl are of special intrest.

Preference is given to isoindoline compounds of the formula I in which R is methyl, unsubstituted or chlorine-, methyl-, methoxy- or ethoxy-substituted phenyl, $R_1$ and $R_2$ are hydrogen and X is a group of the formula

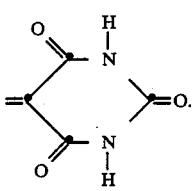

Particular preference is given to isoindoline compounds of the formula I in which R is methyl or phenyl, $R_1$ and $R_2$ are hydrogen and X is a group of the formula

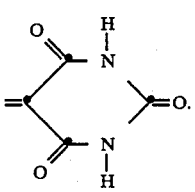

The isoindolines according to the invention are obtained in analogy to methods known per se (a) by reaction of an isoindoline of the formula

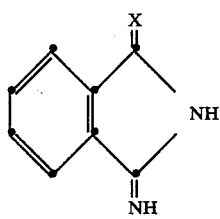
(II)

with a quinazolone derivative of the formula

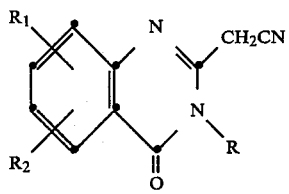
(III)

in acid medium, or (b) by reaction of an isoindoline of the formula

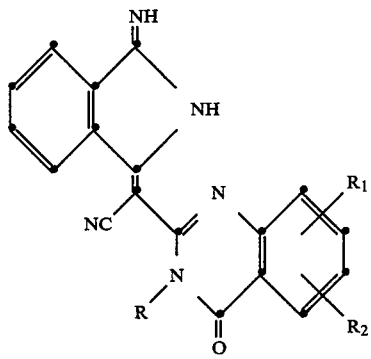
(IV)

with a compound of the formula $H_2X$ (V)

also in acid medium, the substituents R, $R_1$, $R_2$ and X in the formulae II, III, IV and V being as defined above.

Symmetrical isoindoline compounds of the formula I can also be obtained without isolation of the monocondensation product directly by reaction of the diiminoisoindoline of the formula

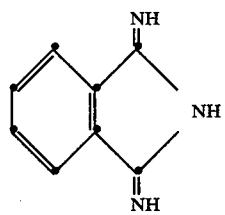
(VI)

with the two-fold stoichiometric amount of a quinazolone derivative of the formula III.

The compounds of the formula II and V are known compounds. The compound of the formula IV is obtained by reaction of the diiminoisoindoline of the formula VI with a quinazolone derivative of the formula III by methods known per se.

In the quinazolone compounds of the formula III, R is preferably $C_1$–$C_4$alkyl, in particular methyl, chlorine-, methyl-, methoxy- or ethoxy-substituted or in particular unsubstituted phenyl, and $R_1$ and $R_2$ are preferably hydrogen.

The quinazolone compounds of the formula III and their preparation have been described in Japanese Laying Open (Kokai) No. 75-33,076.

The isoindolines of the formula I according to the invention and obtained by the abovementioned methods in most cases already precipitate in the heat and can be isolated in pure form by filtering them off and, if necessary, by washing with organic solvents.

The isoindolines of the formula I according to the invention are valuable pigments, which in general have good texture and can in most cases be used as crude products. If necessary or desired, the crude products can be converted into a finely disperse form by milling or kneading. For this purpose, milling auxiliaries, such as glass, plastic, steel or metal milling media, inorganic and/or organic salts are advantageously used in the presence or absence of organic solvents. After milling, the auxiliaries are removed as usual; soluble inorganic salts, for example, by means of water and water-insoluble auxiliaries, for example, by steam distillation. Often it is also possible to improve the pigment properties by treatment of the crude pigments with organic solvents. Not only opaque but also transparent pigment forms are obtained.

The isoindolines according to the invention are suitable as pigments for colouring high-molecular-weight organic material.

Examples of high-molecular-weight organic materials which can be coloured or pigmented by means of the isoindolines according to the invention are cellulose ethers and esters, such as ethylcellulose, nitrocellulose, cellulose acetate or cellulose butyrate, natural or synthetic resins, such as polymerization resins or condensation resins, such as aminoplastic resins, in particular urea and melamine/formaldehyde resins, alkyd resins, phenolic resins, polycarbonates, polyolefins, polystyrene, polyvinyl chloride, polyamides, polyurethanes, polyesters, rubber, casein, silicone and silicone resins, individually or in mixtures.

Examples of suitable high-molecular-weight organic materials in dissolved form as film formers are also linseed oil varnish, nitrocellulose, alkyd resins, phenolic resins, melamine resins, acrylic resins and urea/formaldehyde resins.

The high-molecular-weight organic compounds mentioned can be present individually or in mixtures as plastic materials, melts or in the form of spinning solutions, paints, coating solutions or printing inks. Depending on the intended use, it may be advantageous to use the isoindolines according to the invention as toners or in the form of preparations. Relative to the high-molecular-weight organic material to be pigmented, the isoindolines according to the invention can be used in an amount of 0.01 to 30% by weight, preferably 0.1 to 10% by weight.

The pigmenting of the high-molecular-weight organic substances by means of the isoindolines according to the invention is, for example, carried out in such a manner that this isoindoline, if appropriate in the form of master batches, is mixed with these substrates by using roll mills, mixing or milling apparatuses. The pigmented material is then brought into the desired final form by processes known per se, such as calendering, compression moulding, extrusion, brushing, casting or injection moulding. Frequently it is desired to incorporate so-called plasticizers to the high-molecular-weight compounds before the moulding, in order to produce nonrigid mouldings or decrease their brittleness. Examples of these can be esters of phosphoric acid, phthalic acid or sebacic acid. The plasticizers can be incorporated before or after the isoindolines according to the invention have been incorporated in the polymers. It is also possible, for the purpose of obtaining different hues, to add fillers or other colouring components, such as white, coloured or black pigments, in any desired amounts to the high-molecular-weight, organic substances in addition to the isoindolines according to the invention.

For pigmenting paints and printing inks, the high-molecular-weight organic materials and the isoindolines according to the invention, if appropriate together with additives, such as fillers, other pigments, siccatives or plasticizers, are finely dispersed or dissolved in a common organic solvent or solvent mixture. This can be done by dispersing or dissolving the individual components by themselves or even several of them together and only then combining all components.

The pigmentations obtained, for example in plastics, fibres, coatings or prints, are distinguished by good general properties, for example high colour strength, transparency, purity of hue and gloss, overpainting, migration, heat, light and excellent weather fastness.

The isoindolines according to the invention are preferably suitable for pigmenting aqueous and/or solvent-containing paints, in particular automotive paints. They are very particularly suitable for use in metallic effect coatings.

The examples which follow serve to illustrate the invention.

EXAMPLE 1

29 g of diiminoisoindoline and 21.7 g of cyanomethyl-N-methylquinazolone are heated to boiling with stirring in 400 ml of methanol. After 10 hours, the yellow reaction product is filtered off while hot, washed with methanol and dried. This gives 31.7 g of 1-imino-3-(cyano-N-methylquinazolonemethylene)isoindoline. 3.27 g of this product are warmed with 1.28 g of barbituric acid in 40 ml of glacial acetic acid. This gives a viscous red suspension, which is diluted with another 40 ml of glacial acetic acid to improve the stirrability. After 4 hours of stirring at the reflux temperature, the product is filtered off with suction while hot, washed with methanol and then with water and dried. This gives 4.2 g of a red-orange product of the formula

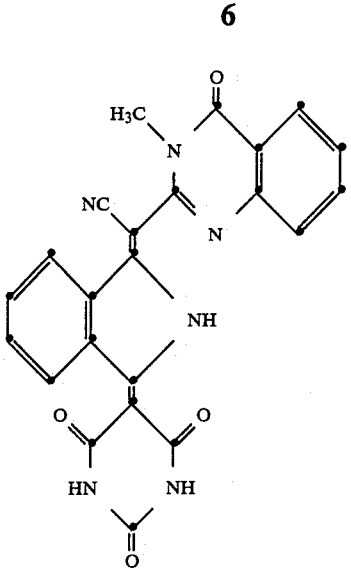

EXAMPLES 2-9

Example 1 is repeated using a quinazolone derivative of the formula

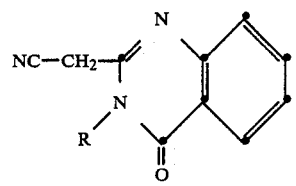

and a compound of the formula $H_2X$ in which R and X have in each case the meaning given in the table below, to give compounds of the formula

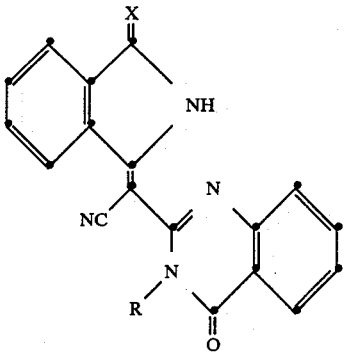

according to the invention.

| Example | R | X | Hue in paints |
|---|---|---|---|
| 2 | —$CH_3$ | 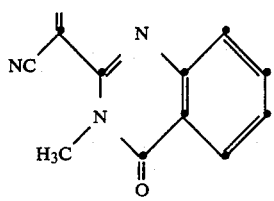 | Red |

-continued
| Example | R | X | Hue in paints |
|---|---|---|---|
| 3 | —CH₃ | 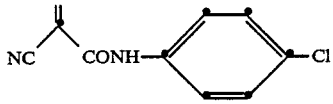 | Orange |
| 4 | —CH₃ | 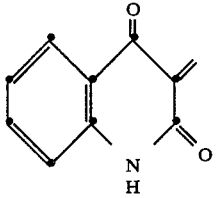 | Orange |
| 5 | 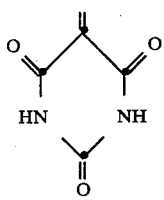 | 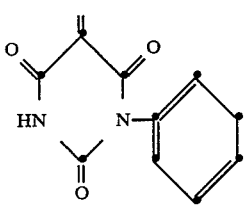 | Red |
| 6 | 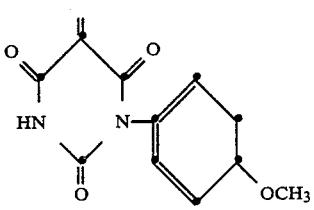 | 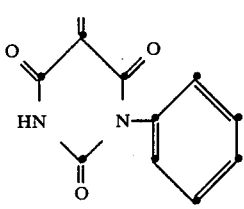 | Orange |
| 7 | 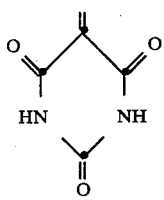 | 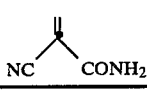 | Brown |
| 8 | —CH₃ | | Red |
| 9 | —CH₃ | | Yellow |
What is claimed is:
1. An isoindoline compound of the formula

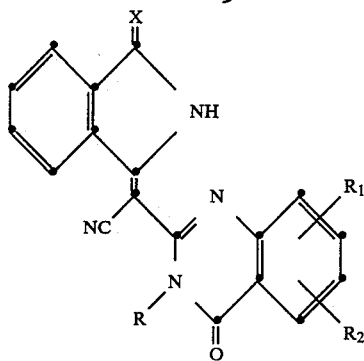

in which R is $C_1$–$C_4$alkyl, unsubstituted or $C_1$–$C_4$alkyl-, $C_1$–$C_4$alkoxy- or halogen-substituted phenyl, benzyl or phenylethyl, $R_1$ and $R_2$, independently of one another are hydrogen, halogen, $C_1$–$C_4$alkyl or $C_1$–$C_4$alkoxy and X is one of the groups of the formulae

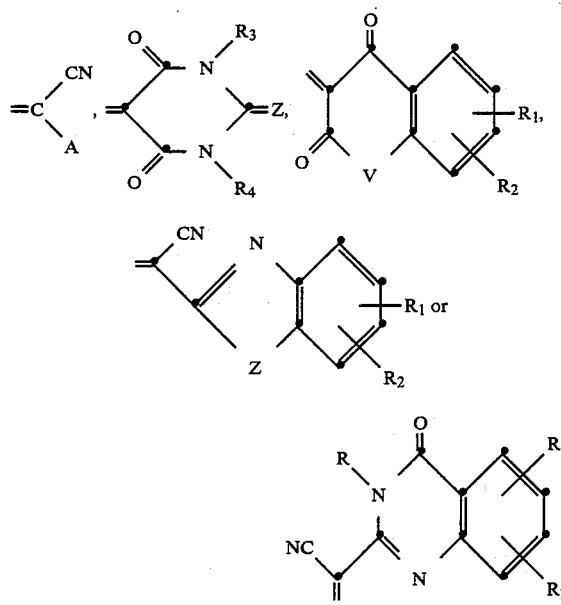

in which R, $R_1$ and $R_2$ are as defined above, A is one of the groups —CN, —COO—($C_1$–$C_4$alkyl) or —CONH—$R_5$, $R_3$, $R_4$ and $R_5$, independently of one another, are hydrogen or have the same meaning as R, V is —NH— or —O— and Z is —O—, —S—, —NH— or —N(CN)—.

2. An isoindoline compound of the formula I according to claim 1, in which R is $C_1$–$C_4$alkyl, unsubstituted or chlorine-, methyl-, methoxy- or ethoxy-substituted phenyl, $R_1$ and $R_2$ are hydrogen and X is one of the groups of the formulae

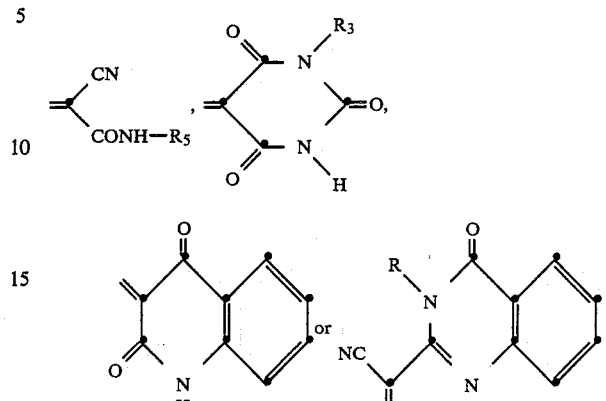

in which R has the meaning already mentioned in this claim, $R_3$ is hydrogen or has the same meaning as R in this claim and $R_5$ is unsubstituted or $C_1$–$C_4$alkyl-, $C_1$–$C_4$alkoxy- or halogen-substituted phenyl.

3. An isoindoline compound of the formula I according to claim 1, in which R is methyl, unsubstituted or chlorine-, methyl-, methoxy- or ethoxy-substituted phenyl, $R_1$ and $R_2$ are hydrogen and X is a group of the formula

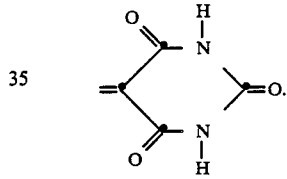

4. An isoindoline compound of the formula I according to claim 1, in which R is methyl or phenyl, $R_1$ and $R_2$ are hydrogen and X is a group of the formula

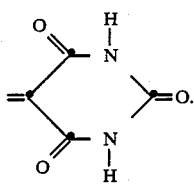

* * * * *